United States Patent [19]

Johnson

[11] 3,898,937
[45] Aug. 12, 1975

[54] WHEEL SLIP SENSING AND CONTROL SYSTEM
[75] Inventor: Lauren L. Johnson, Westchester, Ill.
[73] Assignee: General Motors Corporation, Detroit, Mich.
[22] Filed: Nov. 19, 1973
[21] Appl. No.: 417,213

[52] U.S. Cl. .................................. 105/61; 318/52
[51] Int. Cl. ........................................ B61c 15/12
[58] Field of Search ....................... 105/61; 318/52

[56] References Cited
UNITED STATES PATENTS
| | | | |
|---|---|---|---|
| 3,737,745 | 6/1973 | Chevaugeon | 318/52 |
| 3,743,900 | 7/1973 | Johansson | 318/52 |
| 3,790,871 | 2/1974 | Smith | 318/52 |

Primary Examiner—M. Henson Wood, Jr.
Assistant Examiner—Reinhard J. Eisenzopf
Attorney, Agent, or Firm—Warren D. Hill

[57] ABSTRACT

In a locomotive having a generator and several traction motors in parallel or series-parallel, a transducer circuit develops a generator signal proportional to generator current plus a value proportional to generator voltage. Other transducers develop motor signals proportional to each motor current such that all signals are of comparable magnitude during normal operation. Each motor signal is compared with a generator signal so that as motor current decreases during wheel slip, the signal difference is detected to produce a wheel slip signal. An auxiliary motor field supply responsive to the wheel slip signal increases field strength on the slipping motor so that the slip is arrested. In addition, a signal proportional to generator voltage is compared with each motor signal to detect motor overspeed.

6 Claims, 2 Drawing Figures

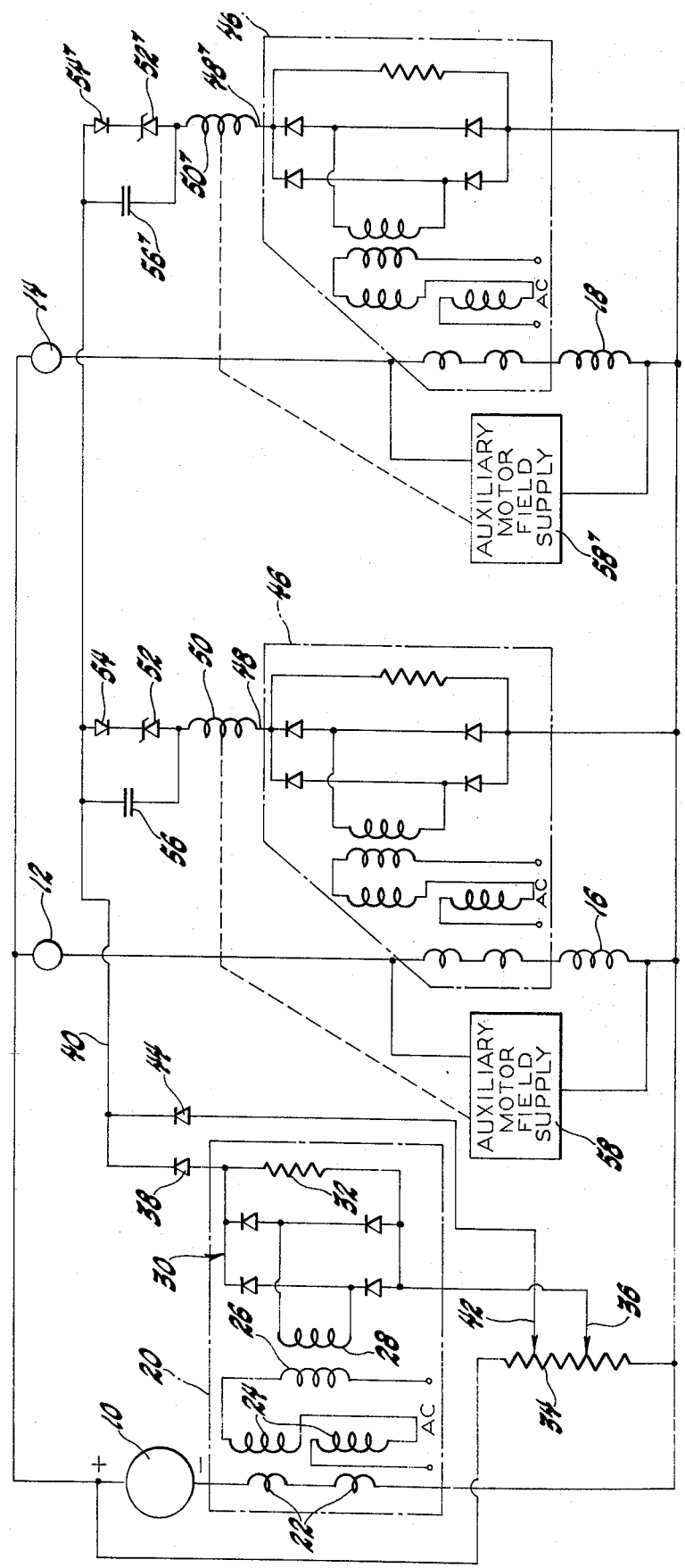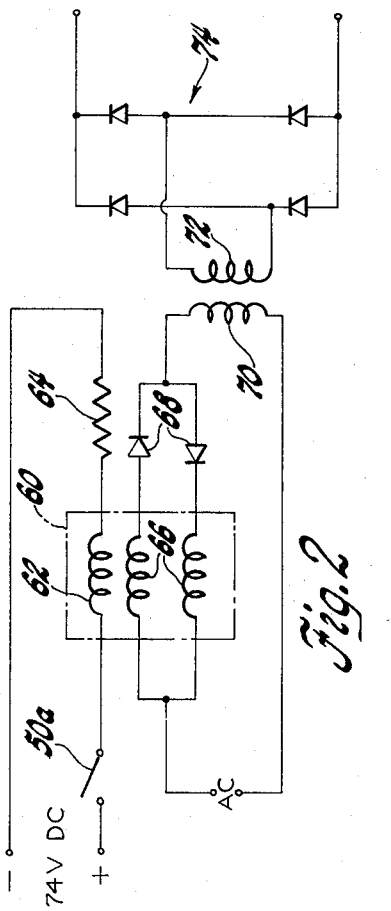
Fig.1
Fig.2

WHEEL SLIP SENSING AND CONTROL SYSTEM

This invention relates to wheel slip sensing and control systems for electrical traction motors such as those used on locomotives.

There have been many types of wheel slip controls proposed for locomotives which typically operate by comparing currents or voltages of two or more motors with each other in order to detect imbalance due to wheel slipping. Such arrangements depend upon at least one of the motors in each comparison circuit operating normally to provide a reference for another motor. Further, usual locomotive transmission systems operate at constant power over a wide speed range. In that case, smaller differences in the motor current at high voltage condition should be sensed than at low voltages to achieve good wheel slip detection. That capability has not been provided in prior systems. In addition, it has been customary to provide a slip indication without identification of which motor is driving the slipping wheel. Thus it has been necessary to reduce the power to all motors in order to correct the one motor which is driving the slipping wheel, thereby reducing the traction effort of every motor.

It is therefore a general object of the invention to provide a wheel slip control system for traction motors in which the motor voltages or currents are not directly dependent on each other for a slip indication.

It is another object of the invention to provide such a system which detects synchronous slip and motor overspeed without the use of separate detectors.

It is still another object to provide such a system in which the motor related to the slipping wheel is identified so that slip correction may be effected without reducing power to non-slipping wheels.

The invention is carried out by providing a sensor for producing a source signal which varies with generator current or other source current, providing sensors for producing motor signals which vary according to each motor current and detectors associated with each motor for comparing the respective motor signal with the source signal such that variation from a normal relationship of these signals is instantaneously detected as wheel slip occurs. A source voltage detector adds a source voltage value to the source signal to increase sensitivity of the system to wheel slip with increasing source voltages. In addition, a source voltage sensor provides a source voltage signal for comparison with each motor signal by the detectors in order to detect overspeed conditions. The invention further contemplates a wheel slip correction circuit operative only on the motor identified with the slipping wheel to correct either wheel slip or overspeed.

The above and other advantages will be made more apparent from the following specification taken in conjunction with the accompanying drawings wherein like reference numerals refer to like parts and wherein:

FIG. 1 is a schematic electrical diagram of the wheel slip sensing and control system according to the invention, and FIG. 2 is a schematic electrical diagram of the auxiliary motor field supply of FIG. 1.

The system described herein utilizes a DC generator driving a pair of series type traction motors arranged in parallel, however, the invention is not limited to that specific configuration. Rather the invention comprehends a source including a right of way power supply or a generator in which the source transmission is of substantially constant power over a wide speed range which results in high voltage, low motor current at high speed and low voltage, high motor current at low speed. The motor arrangement may be parallel or series-parallel, the only requirement being there be a plurality of motor branches in parallel, each branch containing a single motor or a plurality of motors in series. The system includes conventional locomotive auxiliary power supplies not shown to furnish 74 volts DC and an AC signal.

Referring now to FIG. 1, a DC generator 10 is connected to series type motors 12 and 14 arranged in parallel, having field coil windings 16 and 18 respectively. A current transductor 20, arranged to sense the generator current, is of well known configuration and comprises a saturable reactor having a saturable core, not shown, DC excitation coils 22 carying the generator current and a pair of oppositely wound AC excitation coils 24 in series with a transformer primary winding 26 and an AC source. A transformer secondary winding 28 is connected to a full wave rectifying bridge 30, the outputs of which are connected across a resistor 32. In the case of no generator current through the DC excitation windings 22, the AC excitation windings 24 have a very high impedance so that the AC current flow through the primary winding 26 is insignificant and the bridge 30 produces essentially no current output. When, however, the generator current is applied to the windings 22, the impedance of the windings 24 decreases and the AC current through the primary windings 26 increases. The resulting increase apparent in the secondary winding 28 is then rectified to provide a bridge output current through the resistor 32 which is proportional to the generator current. The size of the resistor 32 is selected to scale the output voltage of the transductor assembly 20 to a desired value for a given generator current value. In the present example, 25 volts across the resistor 32 corresponds to 1,000 amps generator current. A voltage divider comprises a resistor 34 across the generator 10 and a tap 36 which is connected to the anode side of the bridge 30 to bias the bridge to a level proportional to the generator voltage. The voltage divider is set to provide a potential of 3.2 volts at the tap 36 when generator potential is 1,000 volts. The sum of the potential on tap 36 and the potential across the resistor 32 comprises a source signal which is applied through a diode 38 to a line 40. A source voltage signal proportional to the generator voltage is produced by a second tap 42 on the resistor 34 which is supplied through a diode 44 to the line 40.

The motor branch containing motor 12 includes a transductor assembly 46 similar to the assembly 20. It senses the motor current and provides a motor signal output proportional thereto at line 48. A wheel slip relay 50 is connected at one end to line 48 and has its other end connected through Zener diode 52 and another diode 54 to line 40. Capacitor 56 is arranged in parallel with the diodes 52 and 54. An auxiliary motor field supply 58 actuated by the slip relay 50 is connected across the field winding 16 of motor 12 as well as the DC excitation windings of the transductor assembly 46. The branch containing motor 14 has associated therewith circuit elements 46' through 58' corresponding to the elements 46 through 58 associated with the branch containing motor 12. The transductors 46 and 46' are scaled to provide an output signal on line 48 and 48' proportional to the responsive motor currents wherein a transductor output of 60 volts corresponds to motor current of 1,000 amps. The Zener diodes 52 and 52' are selected to provide sufficient voltage drop so that the wheel slip relays 50 and 50' will be actuated when the source signal on line 40 exceeds a motor signal on line 48 or 48' by 6 volts.

FIG. 2 illustrates the auxiliary field motor supply 58 or 58'. It comprises a magnetic amplifier 60 having a DC excitation coil 62, a relay switch 50a which comprises the contacts of wheel slip relay 50, and a resistor 64 serially connected between a source of 74 volts DC and return. The magnetic amplifier also has a pair of AC excitation coils 66, each connected in series with a diode 68 to form a parallel circuit which is in series with a transformer primary winding 70 and an AC source. The transformer secondary winding 72 is connected to a full wave rectifying bridge which forms the output of the auxiliary motor field supply. When the switch 50a is open, the AC exciting coils have high impedance and pass substantially no AC current. However, when the slip relay 50 is energized to close the contacts 50a, the DC excitation coil 62 is energized to lower the impedance of the AC excitation coil 66 so that the primary winding 70 is energized to produce an output current from the rectifying bridge 74 which is connected across the motor field coil 16 or 18.

Under ideal conditions, the motor signal on line 48 is slightly higher than the voltage in the source signal on line 40 so that the diode 54 is backbiased and the capacitor 56 is charged. If the wheel driven by the motor 12 slips abruptly, the motor current and hence the motor signal will drop very fast while the source signal on line 40 only drops about half as fast, assuming the speed of motor 14 remains constant. Thus if the wheel acceleration is high enough, the discharge of capacitor 56 will provide sufficient current to activate the slip relay 50. The auxiliary motor field supply 58 in response to the actuation supplies current to the field coil 16 to maintain a minimum field strength which reduces motor torque and arrests the slip.

When the wheel driven by motor 12 slips at a low rate insufficient to actuate signal wheel slip relay 50 through the discharge of the capacitor 56, the current of motor 12 will slowly decrease so that there will be a disparity between the currents of motor 12 and 14. Since a low degree of slipping is not undesirable and a certain difference in motor currents is allowable, it is not intended to correct minor wheel slip or small motor current variations. On the other hand, it is necessary to identify large motor current differences and to take corrective action when they occur. The amount of allowable motor current difference varies with locomotive speed so that at stall condition, and low generator voltage, a large motor current differential, say 400 amps, is allowable whereas at substantial locomotive speeds and high generator voltage, a lower motor current differential, say 200 amps, is acceptable. By calibrating the output voltage of transductor 46 so that the motor signal is slightly higher than the source signal on line 40 under ideal conditions, a wheel slip causing speed increase of motor 12 and hence a certain motor current difference must occur for the wheel slip relay 50 to be actuated. Since the source signal in part comprises a generator voltage factor, the amount of motor current difference is varied by generator voltage and therefore vehicle speed. By way of example, assume a stalled motor condition wherein each motor current is 1,000 amps and the motor signal at lines 48 and 48' is 60 volts. The generator current transductor output across the resistor 32 is 50 volts and the voltage at the tap 36 is 1.5 volts so that the total source signal on line 40 is 51.5 volts, ignoring the drops through the diode 38. Thus the diodes 54 and 54' are backbiased and prevent any current flow through the wheel slip relays 50 and 50'. Now if the wheel driven by motor 12 slips, the motor current is severely reduced. If the current drops from 1,000 to 600 amps, the motor signal on line 48 drops to 36 volts. The generator output will change to 1,600 amps and 625 volts giving a source signal of 40 volts across resistor 32 and 2 volts at the tap 36 to provide a total source signal of 42 volts. The difference between the source signal and the motor signal on line 48 is then 6 volts which is sufficient to actuate the relay.

In the case of normal operation at substantial speed at 1,000 volts generator output and 500 amps in each motor circuit, assume that it is desirable to operate at a maximum steady state motor differential of 200 amps. Thus if the wheel driven by motor 12 slips such that the motor current drops to 300 amps, the motor signal on line 48 will be 18 volts. The generator output will have then changed to 800 amps current and 1,250 voltage. Then the source signal will comprise 20 volts developed across resistor 32 and 4 volts developed at the tap 36 to provide a total of 24 volts. Thus there is a differential of 6 volts between the source signal and the motor signal which, as in the previous example, is sufficient to actuate the wheel slip relay 50 which in turn energizes the auxiliary motor field supply 58 to arrest wheel slip. It will be noted that the increased current through the field coil 16 from the auxiliary supply 58 not only increases field strength to reduce motor torque but also increases the current through the DC exciting coils of the current transductor 46 thereby increasing the motor signal to de-energize the wheel slip relay 50 and cut off the output of the auxiliary supply 58. In the event the condition causing the wheel slip still persists, the motor signal voltage will again drop and the process will be repeated as often as required to restore the motor 12 to a non-slipping condition.

In the event of synchronous speed slip of both motors or of motor overspeed of either or both motors, one or both motor signals will decrease and the source signal may also decrease to an extent that the wheel slip relays will not be operated. However, the increased generator voltage as sensed at the tap 42 of the potentiometer 34 will provide through the diode 44 a generator voltage signal on line 40 which is scaled to a value substantially greater than the diminished motor signal thereby causing actuation of the wheel slip relay and actuation of the auxiliary supply 58 and/or 58'. The position of the tap 42 is selected in accordance with the maximum permissible amount of overspeed.

It will be apparent from the above description that the system according to the invention will readily detect and control wheel slip of an individual motor in a parallel motor arrangement and can do so without detracting from the operation of other motors in the system and moreover that the sensitivity of the system is varied for different operating conditions to accomodate various allowable motor current differences at different vehicle speeds. It will also be apparent that the system can be expanded to accomodate more than two parallel motor branches and that each branch may contain more than one motor. It should be noted, however, that in the case of a series-parallel arrangement where each motor branch contains a pair of motors, for example, the motor current will be the same for both motors connected in series so that motor current detection and comparison with the source signal will indicate which motor branch in the system contains a motor driving a slipping wheel but will not identify which of the two motors is slipping. Thus only one current transductor assembly and slip relay will be used for each branch and further each branch will have associated therewith an auxiliary motor field supply which will simultaneously operate on both motor fields to effect correction of the slip.

In addition, it is important to note that the system is not limited to a relay for slip detection but rather one of several alternatives may be used such as solid state devices and that the detector devices and the auxiliary motor field supplies need not be limited to an on/off response occurring at the maximum allowable slip condition but rather may be responsive in varying degrees over a wide range of slip values to proportionately modulate the motor field strength to that required to arrest the slip.

The embodiment of the invention described herein is for purposes of illustration and the scope of the invention is intended to be limited only by the following claims:

What is claimed is:

1. A wheel slip detection apparatus for a vehicle having a plurality of traction motors adapted to drive separate traction wheels and having an electrical source for supplying an electrical output for operating the traction motors, the motors being electrically arranged in a plurality of parallel branches, and each branch containing a single motor or a plurality of motors in series, the apparatus including means responsive to the electrical output for providing a source signal varying as a function of source current, each branch having associated therewith means responsive to the motor current for providing a motor signal varying as a function of the motor current, the source signal having a predetermined normal relationship with each motor signal during normal wheel operation, and means associated with each branch and responsive to a function of the source signal and the respective motor signal for detecting an abnormal relationship between the source signal and the motor signal indicative of slipping of a wheel.

2. A wheel slip detection and connection apparatus for a vehicle having a plurality of series traction motors adapted to drive separate traction wheels and having an electrical source for supplying an electrical output for operating the traction motors, the motors being electrically arranged in a plurality of parallel branches, and each branch containing a single motor or a plurality of motors in series, the apparatus including means responsive to the electrical output for providing a source signal varying as a function of source current, each branch having associated therewith means responsive to the motor current therein for providing a motor signal varying as a function of the motor current, the source signal having a predetermined normal relationship with each motor signal during normal wheel operation, detector means associated with each branch and responsive to a function of the source signal and the respective motor signal for detecting an abnormal relationship between the source signal and the motor signal indicative of slipping of a wheel, and means associated with each branch and responsive to its respective detector means for altering the motor operation to correct the wheel slip when indicated by the slip signal from the detector means.

3. A wheel slip detection and correction apparatus for a vehicle having a plurality of series traction motors adapted to drive separate traction wheels and having an electrical source for supplying an electrical output for operating the traction motors, the motors being electrically arranged in a plurality of parallel branches, and each branch containing a single motor or a plurality of motors in series, the apparatus including means responsive to the electrical output for providing a source signal varying as a function of source current, each branch having associated therewith means responsive to the motor current therein for providing a motor signal varying as a function of the motor current, the source signal and each motor signal being scaled to be substantially equal when no wheel slipping occurs, detector means associated with each branch for comparing the respective motor signal and the source signal and for producing a wheel slip signal when the difference between the signals exceeds a determinable amount, and means associated with each branch and responsive to its respective detector means for increasing the motor field current to correct the wheel slip when indicated by the slip signal from the detector means.

4. A wheel slip detection and correction apparatus for a vehicle having a plurality of series traction motors adapted to drive separate traction wheels and having an electrical source for supplying an electrical output for operating the traction motors, the motors being electrically arranged in a plurality of parallel branches, and each branch containing a single motor or a plurality of motors in series, the apparatus including means responsive to the electrical output for providing a source signal varying primarily in proportion to source current, each branch having associated therewith means responsive to the motor current therein for providing a motor signal varying in proportion to the motor current, the source signal being scaled to be slightly smaller than each motor signal when no wheel slipping occurs and the motor currents are substantially equal, detector means associated with each branch for comparing the respective motor signal and the source signal and for producing a wheel slip signal when the source signal exceeds the motor signal by a determinable amount indicative that the respective motor current is lower than motor current in another branch by a maximum allowable amount which indicates the respective wheel is slipping to an unacceptable degree, means for scheduling the maximum allowable difference in motor currents according to the rolling condition of the wheels including means for increasing the source signal by a value proportional to the source voltage, and means associated with each branch and responsive to its respective detector means for increasing the motor field current to correct the wheel slip when indicated by the slip signal from the detector means.

5. A wheel slip and overspeed detection and correction apparatus for a vehicle having a plurality of series traction motors adapted to drive separate traction wheels and having an electrical source for supplying an electrical output for operating the traction motors, the motors being electrically arranged in a plurality of parallel branches, and each branch containing a single motor or a plurality of motors in series, the apparatus including means responsive to the electrical output for providing a source signal varying as a function of source current and a source voltage signal varying as a function of the source voltage, each branch having associated therewith means responsive to the motor current therein for providing a motor signal varying as a function of the motor current such that the motor signal decreases with decreasing motor current when motor speed increases, the source signal having a predetermined normal relationship with each motor signal during non-slip wheel operation, means for scaling the source voltage signal to a value slightly less than the motor signal under normal motor speed conditions such that during motor overspeed conditions the decreased motor signal becomes less than the source voltage signal detector means associated with each branch and responsive to a function of the source signal and the respective motor signal for detecting an abnormal relationship between the source signal and the motor signal indicative of slipping of a wheel and responsive to relative values of the source voltage signal and the respective motor signal for detecting a motor overspeed condition, and means associated with each branch and responsive to its respective detector means for increasing the motor field current to correct the wheel slip or overspeed when indicated by the detector means.

6. A wheel slip and overspeed detection and correction apparatus for a vehicle having a plurality of series traction motors adapted to drive separate traction wheel and having an electrical source for supplying an electrical output for operating the traction motors, the motors being electrically arranged in a plurality of parallel branches, and each branch containing a single motor or a plurality of motors in series, the apparatus including means responsive to the electrical output for providing a source signal varying primarily in proportion to source current and a source voltage signal varying as a function of the source voltage, each branch having associated therewith means responsive to the motor current therein for providing a motor signal varying in proportion to the motor current such that the motor signal decreases with decreasing motor current when motor speed increases, the source signal being scaled to be slightly smaller than each motor signal when no wheel slipping occurs and the motor currents are substantially equal, detector means associated with each branch for comparing the respective motor signal and the source signal and for producing a wheel slip signal when the source signal exceeds the motor signal by a determinable amount indicative that the respective motor current is lower than motor current in another branch by a maximum allowable amount and that the respective wheel is slipping to an unacceptable degree, means for scheduling the maximum allowable difference in motor currents according to the rolling condition of the wheels including means for increasing the source signal by a value proportional to the source voltage, the detector means further including means responsive to the rate of change in the difference between the motor signal and source signal for providing a wheel slip signal when wheel acceleration exceeds a predetermined value, the detector means further being responsive to relative values of the source voltage signal and the respective motor signal for detecting a motor overspeed condition and producing a slip signal when motor overspeed occurs, and means associated with each branch and responsive to its respective detector means for increasing the motor field current to correct the wheel slip when indicated by a slip signal from the detector means.

* * * * *